April 17, 1934.  A. S. HOBERG ET AL  1,955,368
HOPPER DISCHARGE MECHANISM
Filed July 25, 1932   3 Sheets-Sheet 1
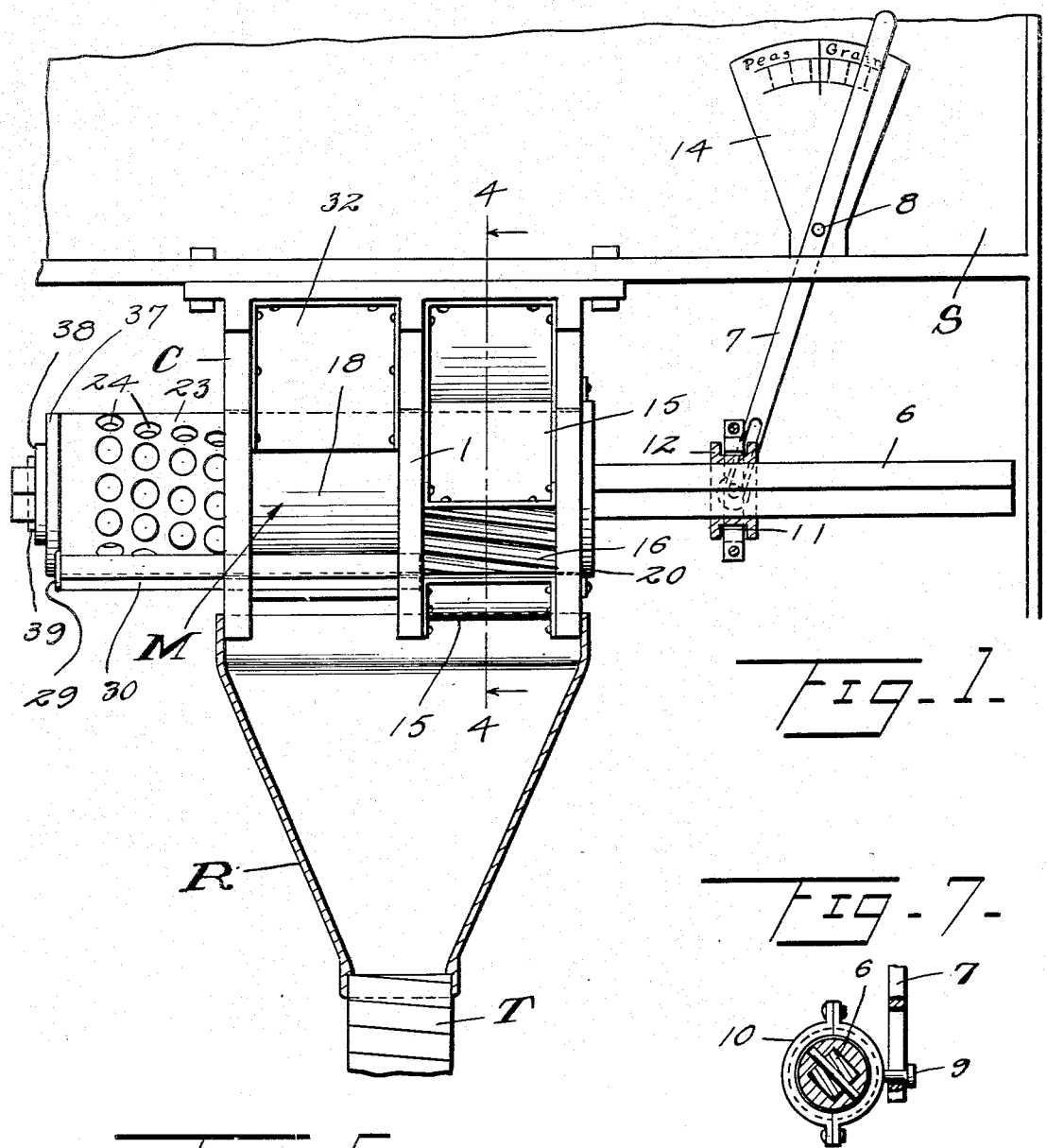
Fig-1-
Fig-7-
Fig-6-
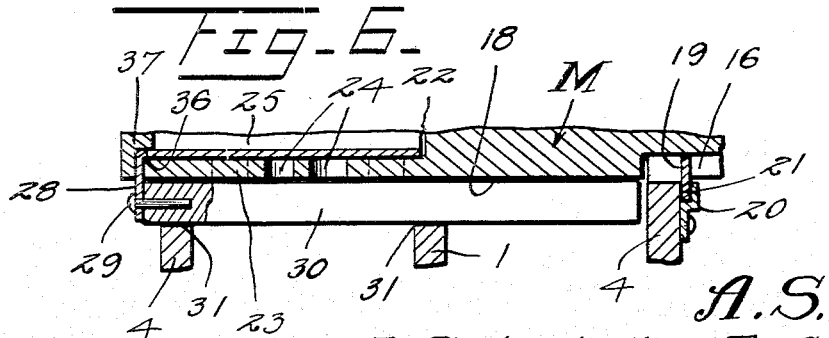
Inventor
A. S. Hoberg,
J. Schabel, E. C. Schwantes
By Watson E. Coleman
Attorney April 17, 1934.  A. S. HOBERG ET AL  1,955,368
HOPPER DISCHARGE MECHANISM
Filed July 23, 1932  3 Sheets-Sheet 2
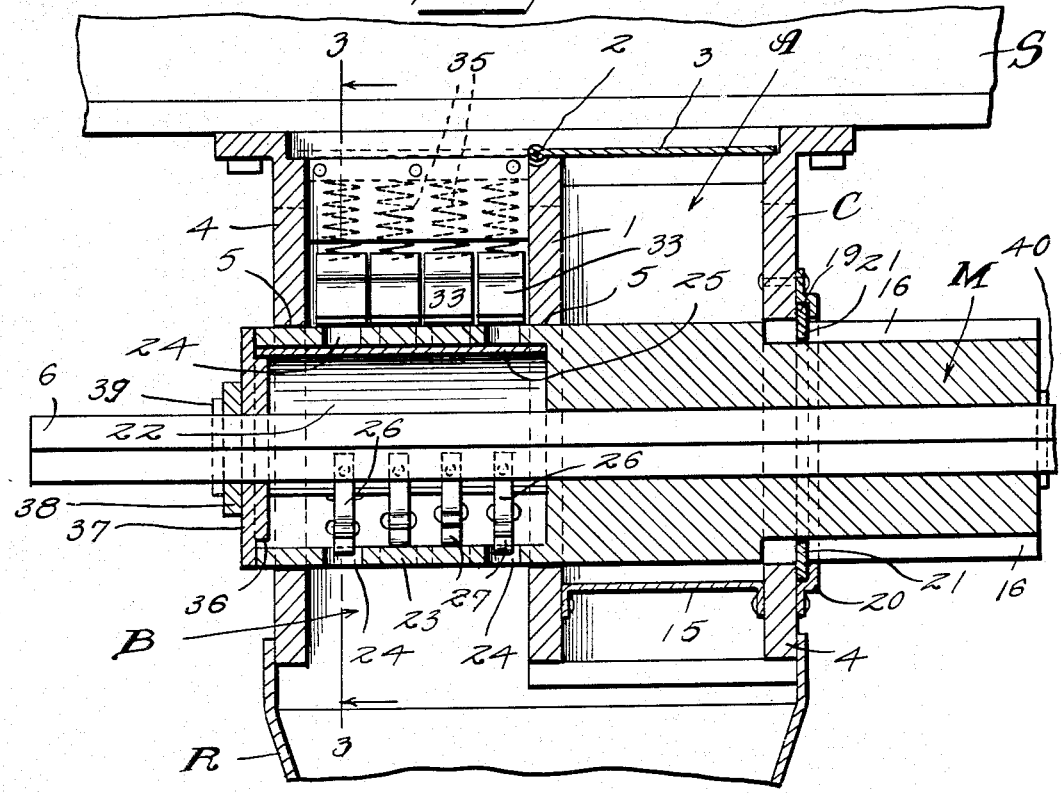
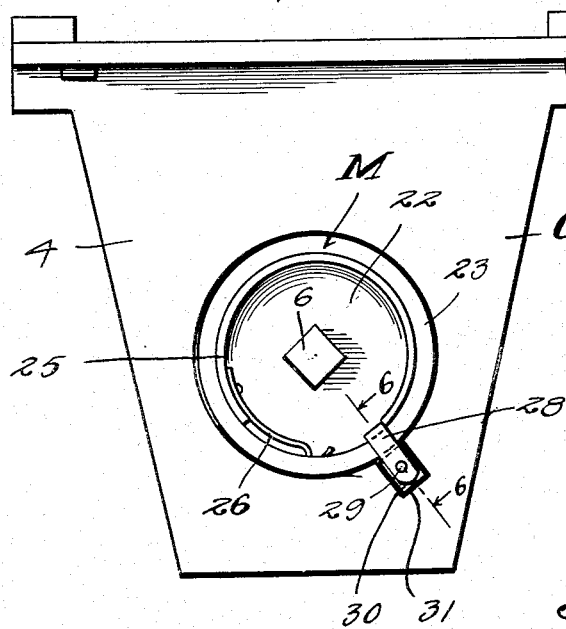
Inventors
A. S. Hoberg,
J. Schabel, E. C. Schwantes
By Watson E. Coleman
Attorney

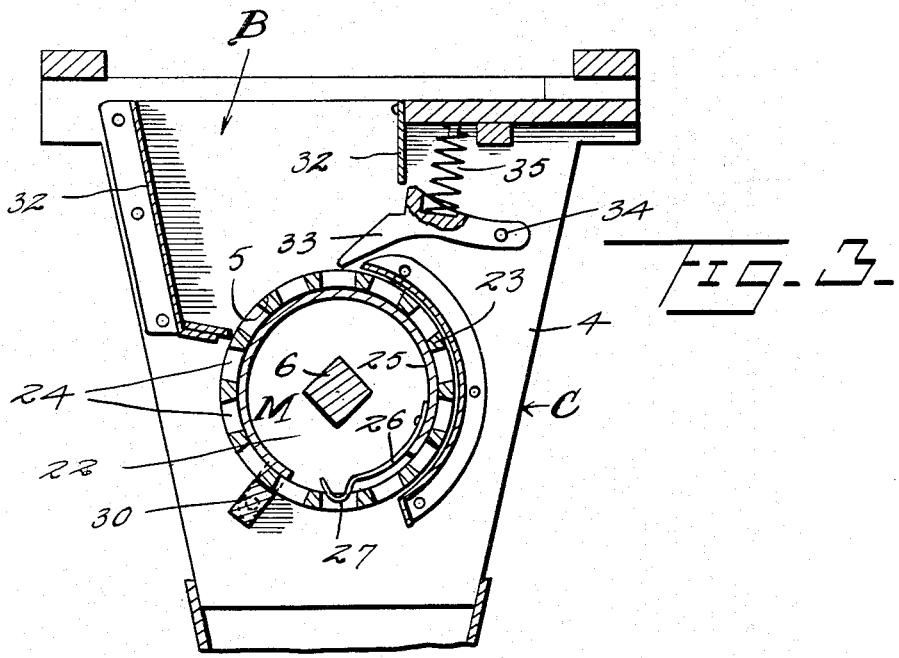
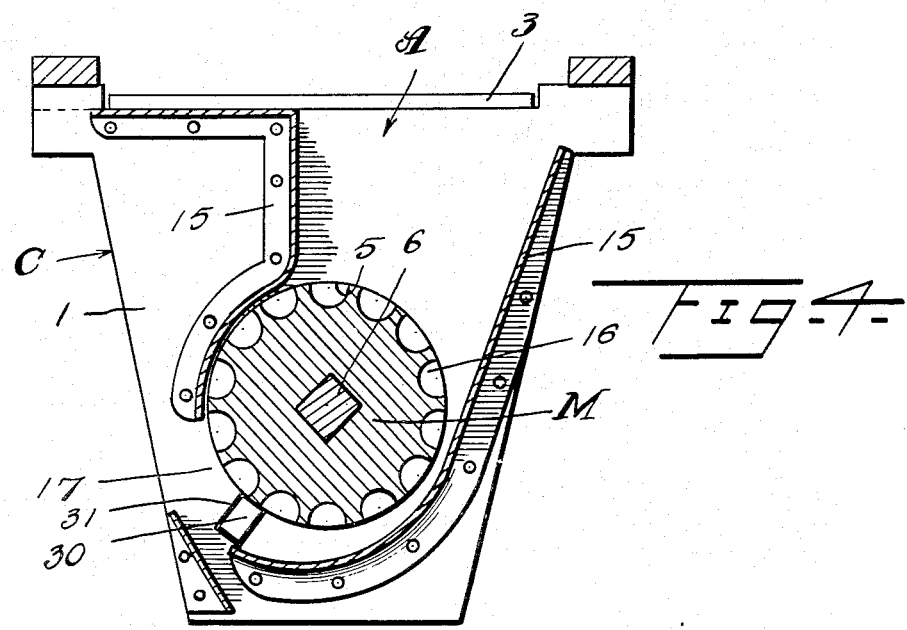

Patented Apr. 17, 1934

1,955,368

UNITED STATES PATENT OFFICE 1,955,368

HOPPER DISCHARGE MECHANISM

Arthur S. Hoberg, Horicon, Joseph Schabel, Mayville, and Edwin C. Schwantes, Horicon, Wis.

Application July 26, 1932, Serial No. 624,872

4 Claims. (Cl. 221—137)

This invention relates to planters and has relation more particularly to a hopper discharging mechanism, and it is an object of the invention to provide a mechanism of this kind including a rotatable delivery member mounted for endwise movement whereby the variable discharge of the seed may be accomplished as the requirements of practice prefer.

It is also an object of the invention to provide a mechanism of this kind including a rotating dropper together with means associated therewith whereby the dropper is particularly adapted for use in the planting of peas or kindred seed and wherein the dropper is of a character to assure effective planting of the peas in a field.

The invention consists in the details of construction and in the combination and arrangement of the several parts of our improved hopper discharge mechanism whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view partly in elevation and partly in section illustrating a portion of a planter having a hopped discharge mechanism associated therewith and constructed in accordance with an embodiment of our invention;

Figure 2 is an enlarged fragmentary view partly in section and partly in elevation illustrating a discharging mechanism as herein disclosed with certain of the parts in position different from that shown in Figure 1;

Figure 3 is a detailed sectional view taken substantially on the line 3—3 of Figure 2;

Figure 4 is a detailed sectional view taken substantially on the line 4—4 of Figure 1;

Figure 5 is a view in side elevation of a portion of the structure illustrated in Figure 2 with parts removed;

Figure 6 is an enlarged fragmentary sectional view taken substantially on the line 6—6 of Figure 5;

Figure 7 is a fragmentary view partly in section and partly in elevation illustrating a part of the means for shifting the dropper;

Figure 8 is a fragmentary view in elevation of the dropper member or feed roll ring herein embodied.

As disclosed in the accompanying drawings, S denotes a conventional seed box which has depending therefrom and in communication therewith a seed cup C. This cup C is divided by an intermediate partition 1 into two compartments A and B both of which discharging within a conventional receiver R which has leading therefrom as is well known a drain tube or spout T adapted to lead to a boot or other point of discharge.

Hingedly connected, as at 2, to the upper portion of the partition 1 is a swinging plate 3 serving as a valve member, said plate when in one position cutting off the compartment A from the box S and when in a second position cutting off the compartment B from said box S. The side walls 4 of the cup C together with the partition wall 1 are provided with the aligned and relatively large openings 5 through which pass a dropper member M. This member M, as herein disclosed, is of a length considerably greater than the width of the cup C and is cylindrical in form. This member M rotates with a shaft 6 driven in any desired manner from a movable part of the planter proper and which shaft, however, is adapted to have endwise movement in both directions. As herein disclosed, such movement of the shaft 6 is accomplished by a hand lever 7 pivotally mounted, as at 8, upon the box S and having operative connection, as at 9, with a ring member 10 engaged within the peripheral groove 11 of a collar 12 fixed to the shaft 6. As herein disclosed, this member 10 comprises separable sections to facilitate its application to the collar 12.

The lever 7 coacts with an indicating plate 14 whereby the extent of movement of the shaft 6 in either direction may be readily determined for a purpose to be hereinafter set forth.

The compartment A is provided with the front and rear walls 15 so formed and arranged to have portions thereof closely approach and conform to the general periphery of the dropper member M and this compartment A is particularly intended to receive grain which is to be carried out therefrom by the flutes 16 arranged in one end portion of the member M and disposed in a direction lengthwise thereof.

As the member M rotates grain within the compartment A will be discharged out into the receiver R through the properly positioned delivery opening 17 provided between the front and rear walls 15. The intermediate portion of the member M immediately adjacent to the fluted end portion of said member has its periphery smooth and unbroken, as indicated at 18, so that upon endwise movement of the shaft 6 in one direction carry the flutes 16 out from the compartment A and bring the portion 18 of the member M for a corresponding extent within the compartment A whereby effective regulation of the amount of grain delivered may be had. To prevent the grain from wasting out through the adjacent side wall 4 of the cup C out through the flutes 16 we provide a ring 19 freely held against the outer face of the wall 4 by the holding plate 20 anchored to such wall. This ring 19 is provided with the inwardly directed lugs 21 which extend within the flutes 16 and thus shut off the flow from the compartment A through the side wall 4 of such compartment.

The end portion of the member M remote from the flutes 16 is provided with an axially disposed socket or drum 22 of material diameter and which is open at its outer end. The socket or drum 22 is also of a depth in excess of the interior width of the compartment B and the peripheral wall 23 of the socket or drum 22 is provided with the openings 24 adapted to receive peas or kindred seed within the compartment B. These openings 24 may of course be arranged in any desired manner but we find it of advantage to have four circumferentially disposed series of openings with the openings of each series slightly set back with respect to the others so that when the member M is in rotation a substantially continuous feed of peas will be effected.

Extending within the socket or drum 22 from the outer end thereof and snugly engaging therein is a segmental tubular member 25 herein disclosed as in excess of a semi-circle and having its opposed longitudinal margins spaced apart a considerable distance as is particularly illustrated in Figures 3 and 5 of the accompanying drawings. When applied the spaced marginal portions of the member 25 are downwardly directed so that for the major portion of the rotation of the member M the openings 24 will be closed but as the openings reach a down position the peas carried thereby may readily drop therefrom.

To positively assure the discharge of the peas or the like within the openings 24 the rear longitudinal marginal portion of the member 25 has secured thereto the spring arms 26, each of which being disposed in the same general direction as a series of openings 24 and the free end portion of each of said arms is provided with an outstanding knob 27 which springs from within into an opening 24 a distance sufficient to positively assure the expulsion of a pea or kindred seed in the opening.

The member 25 is non-rotatable but is movable with the endwise movement of the member M. As herein disclosed the outer margin of the member 25 is provided with an outstanding radial arm 28 which is secured, as at 29, to an end of a bar 30 and which bar has sliding movement through the adjacent side wall 4 and the partition wall 1, said walls each having properly positioned notches 31 to receive the bar 30 and which notches are in communication with the openings 5 in said walls. Endwise movement of the shaft 6 will also determine the number of series of openings 24 working in the compartment B to regulate the discharge of peas or kindred seeds therefrom.

The compartment B is provided with suitably positioned front and back walls 32. Coacting with the socket end portion of the member M are the dogs 33, there being a dog for each series of openings 24. Each of the dogs is supported, as at 34, for swinging movement and is constantly urged toward the member M by a spring 35. These dogs are so arranged to prevent the peas within the compartment B passing out through the back wall 32 yet in the event several peas or seeds should get into a single opening the dog will readily raise up to allow the same to pass thereby and at the same time will prevent undue crowding of peas in a single opening by ejecting the extra peas from the opening.

The segmental member 25 has its outer end portion surrounding an annular shoulder 36 carried by the inner face of a disc 37 rotating with the shaft 6 and which disc 37 constitutes a closure for the outer open end of the socket 22. The disc 37 is held in position by a washer 38 and a coacting key 39 directed through the shaft 6 and the opposite end portion of the member M has coacting therewith a second key 40 directed through the shaft 6. The keys 39 and 40 hold the member M against endwise movement in either direction independently of the shaft 6.

From the foregoing description it is thought to be obvious that a hopper discharge mechanism constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A hopper discharge means comprising a cup adapted to be disposed beneath a hopper, a partition within the cup dividing said cup into two seed discharging compartments, a rotatable shaft slidable transversely of said compartments, a perforated seed discharging drum secured to said shaft, an imperforate member rotatable with said drum and adapted upon transverse movement of said shaft to cut off the discharge of seed from one of said compartments, a plurality of seed ejecting members disposed within said drum, and a slide member slidably engaging the cup and fixed to said ejecting members for holding said ejecting members against rotation while permitting transverse movement of said ejecting members simultaneous with the drum.

2. A hopper discharge means comprising a cup adapted to be disposed beneath a hopper, a rotatable shaft slidable transversely of the cup, a perforated seed discharging drum secured to said shaft, an imperforate member rotatable with said drum and adapted upon transverse movement of said shaft in one direction to cut off the discharge of the seed from one of said compartments, a plurality of seed ejecting members disposed within said drum, and a slide member slidably engaging the cup and fixed to said ejecting members for holding said ejecting members against rotation while permitting transverse movement of said ejecting members simultaneous with the drum.

3. A hopper discharge means comprising a cup adapted to be disposed beneath a hopper, a rotatable shaft slidable transversely of said cup, a perforated seed discharging drum secured to said shaft, an imperforate member rotatable with said drum and adapted upon transverse movement of said shaft in one direction to cut off the discharge of seed from the cup, a segmental member disposed within said drum in a position with the longitudinal edges thereof lowermost, a plurality of seed ejecting members secured to one of the longitudinal edges of said segmental member and engaging the inside of the drum for ejecting the seeds in the perforations of the drum, and slidable means carried by the cup and engaging the segmental member to hold the segmental member against rotation while permitting slidable movement thereof simultaneous with the movement of the drum transverse of said cup.

4. A hopper discharge means comprising a cup adapted to be disposed beneath a hopper, a rotatable shaft slidable transversely of said cup, a perforated seed discharging drum secured to said shaft, an imperforate member rotatable with said drum and disposed on one side thereof and adapted upon transverse movement of said drum and said shaft to cut off the discharge of seed from said cup, a segmental member disposed within said drum with the longitudinal edges thereof lowermost, said segmental member preventing dropping of the seeds into the interior of the drum, a plurality of seed ejecting members disposed within said drum and secured to said segmental member, and an elongated bar secured to said segmental member and slidably engaging the cup for holding the segmental member and the ejecting members against rotation within the drum while permitting slidable movement of the drum relative to the cup.

ARTHUR S. HOBERG.
JOSEPH SCHABEL.
EDWIN C. SCHWANTES.